United States Patent [19]

Spanhel et al.

[11] Patent Number: 5,470,910
[45] Date of Patent: Nov. 28, 1995

[54] COMPOSITE MATERIALS CONTAINING NANOSCALAR PARTICLES, PROCESS FOR PRODUCING THEM AND THEIR USE FOR OPTICAL COMPONENTS

[75] Inventors: Lubomir Spanhel, Saarbrücken-Dudweiler, Germany; Ertugrul Arpac, Antalia, Turkey; Rüdiger, Riegelsberg; Helmut Schmidt, Saarbrücken-Güdingen, both of Germany

[73] Assignee: Institut Fuer Neue Materialien Gemeinnuetzige GmbH, Saarbruecken, Germany

[21] Appl. No.: 211,431

[22] PCT Filed: Oct. 9, 1992

[86] PCT No.: PCT/EP92/02327

§ 371 Date: Jun. 28, 1994

§ 102(e) Date: Jun. 28, 1994

[87] PCT Pub. No.: WO93/07179

PCT Pub. Date: Apr. 15, 1993

[30] Foreign Application Priority Data

Oct. 10, 1991 [DE] Germany ............... 41 33 621.6

[51] Int. Cl.⁶ .................. C08K 3/10; C08K 3/22; C08K 3/16; C08K 3/30
[52] U.S. Cl. ........... 524/785; 524/779; 524/780; 524/781; 524/783; 524/784; 524/786; 522/79; 522/80; 522/81; 522/83
[58] Field of Search ............... 524/779, 780, 524/781, 782, 783, 784, 785, 786, 430, 431, 432, 435, 437; 522/79, 80, 81, 83

[56] References Cited

U.S. PATENT DOCUMENTS

| | | | |
|---|---|---|---|
| 3,891,594 | 6/1975 | Taylor | 524/779 |
| 4,772,660 | 9/1988 | Kitamura et al. | 524/786 |
| 5,030,608 | 7/1991 | Schubert et al. | 502/300 |
| 5,314,947 | 5/1994 | Sawaragi | 524/784 |
| 5,322,888 | 6/1994 | Kato et al. | 524/783 |

FOREIGN PATENT DOCUMENTS

| | | |
|---|---|---|
| 0220026 | 4/1987 | European Pat. Off. . |
| 0351759 | 1/1990 | European Pat. Off. . |
| 0037817 | 2/1986 | Japan ............... 524/779 |

*Primary Examiner*—Peter Spekely
*Attorney, Agent, or Firm*—Oblon, Spivak, McClelland, Maier & Neustadt

[57] ABSTRACT

Composite materials that contain nanoscaled particles are produced in that a) a compound, which is soluble in the solvent and belongs to a metal of the groups 6 to 15 of the periodic system or lanthanides, is reacted in an organic solvent with b) a precipitating reagent in order to form antimonides, arsenides, chalcogenides, halogenides or phosphides of the metal of the metal compound (a) in the present of c) a bifunctional compound, which exhibits at least one electron pair-donor group and at least one group, which can be converted through polymerization or polycondensation into an organic or inorganic network;

the resulting stabilized sol of nanoscaled particles is mixed with d) a compound, which can be polymerized or cured thermally or photochemically into a polymer, and e) a polymerization initiator;

a hydrolysis and polycondensation of the optionally present groups that can be converted into an inorganic network is conducted; and the material is cured thermally of photochemically.

The nanocomposites according to the invention are especially suitable for optical elements.

18 Claims, No Drawings

COMPOSITE MATERIALS CONTAINING NANOSCALAR PARTICLES, PROCESS FOR PRODUCING THEM AND THEIR USE FOR OPTICAL COMPONENTS

The invention relates to composite materials that contain nanoscaled particles (also called "clusters" in the following) in a polymer matrix. Furthermore, the invention relates to a process for the production of such composite materials, where sols of nanoscaled metal antimonides, metal arsenides, metal chalcogenides, metal halogenides or metal phosphides are stabilized using special stabilizers and then condensed or polymerized into a polymer matrix. Finally the invention relates to the application of the transparent composite materials, prepared in this manner, for optical elements.

In the present application all references to the periodic system of elements refer to the IUPAC recommendation of 1986. By chalcogenides are understood oxides (including oxide hydrates, oxide/hydroxides) and hydroxides, sulfides, selenides and tellurides. The term halogenides includes fluorides, chlorides, bromides and iodides.

The subject matter of the invention is a process for producing composite materials that contain nanoscaled particles, in which process a) a compound, which is soluble in the solvent and belongs to a metal of the groups 6 to 15 of the periodic system or lanthanides, is reacted in an organic solvent with b) a precipitating reagent in order to form antimonides, arsenides, chalcogenides, halogenides or phosphides of the metal of the metal compound (a) in the present of a c) a bifunctional compound, which exhibits at least one electron pair-donor group and at least one group, which can be converted through polymerization or polycondensation into an organic or inorganic network, the resulting stabilized sol of nanoscaled particles is mixed with d) a compound, which can be polymerized or cured thermally or photochemically into a polymer, and e) a polymerization initiator, a hydrolysis and polycondensation of the optionally present groups that can be converted into an inorganic network are conducted, and the material is cured thermally or photochemically.

In the process according to the invention compounds of metals of groups 6 to 15 of the periodic system that are soluble in organic solvents or of lanthanides are used as the starting materials.

Specific metals are Cr, Mo, W (group 6), Mn, Re (group 7), Fe, Ru (group 8), Co, Rh (group 9), Ni, Pd, Pt (group 10), Cu, Ag, Au (group 11), Zn, Cd, Hg (group 12), Al, Ga, In (group 13), Ge, Sn, Pb (group 14) and As, Sb, Bi (group 15) and La, Ce, Gd, Pr, Nd, Sm, Eu, Er, Tb (lanthanides).

Suitable metal compounds (a) are compounds that are soluble in the solvent that is used, such as salts (e.g. halogenides, sulfates, nitrates, phosphates), complex salts (e.g. tetrafluoroborates, hexachloroplatinates), alcoholates (e.g. methylates, ethylates, isopropylates, butylates, glycolates), phenolates, carbonates, carboxylates (e.g. formiates, acetates, propionates, oxalates, succinates, benzoates), hydrides, complexes (coordination compounds like ammine complexes, amine complexes, cyano complexes and chelates like acetylacetonates, aminocarboxylates), metallo-organic compounds (e.g. carbonyl complexes, nitrosyl, σ- and π-complexes).

The precipitating reagent (b) is a compound, which forms during the reaction with the metal compound (a) an antimonide, arsenside, chalcogenide, halogenide or phosphide of the metal. Suitable precipitating reagents (b) are, for example, salts, which are soluble in the reaction medium (e.g. alkali- or alkali earth metal salts) of the corresponding anions (antimonides, arsenides, hydroxides, sulfides, selenides, telurides, fluorides, chlorides, bromides, iodides, phosphides) or corresponding hydrogen compounds (e.g. $SbH_3$, $AsH_3$, $H_2S$, $H_2Se$, $H_2Te$, HCl, HBr, HI, $PH_3$). Furthermore, reactive compounds, which release in situ the actual precipitating agent, can be used as the precipitating reagents (b). Examples are the release of $H_2S$ from tetrasulfides through reaction with $NaBH_4$, the production of hydroxyl ions by means of ammonia, amines (e.g. alkylamines, hexamethylene tetramine) or urea and the production of hydrohalic acids through hydrolysis of carboxylic acid halogenides.

The metal compound (a) and the precipitating reagent (b) are selected in such a manner that a compound that is insoluble or slightly soluble in the reaction medium is produced as a sol.

Specific examples of produceable nanoscaled particles are oxides like ZnO, CdO, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $MoO_3$, or $WO_3$; sulfides like CdS, ZnS, PbS or $Ag_2S$; selenides like GaSe, CdSe or ZnSe; tellurides like ZnTe or CdTe; halogenides like AgCl, AgBr, AgI, CuCl, CuBr, $CdI_2$ or $PbI_2$; arsenides like AlAs, GaAs or GeAs; antimonides like InSb; and phosphides like GaP, InP, $Zn_3P_2$ or $Cd_3P_2$.

Naturally all reaction partners and other substances that are used in the process according to the invention can be applied both as individual compounds and as mixtures comprising two or more compounds.

The bifunctional compound (c) contains at least one electron pair-donor group or a group, which can be converted into such an electron pair-donor group. The electon pair-donor group can be charged neutral or electrically negative and is derived usually from atoms like O, N or S. Such groups are, e.g., primary, secondary or tertiary amine groups or amide groups, nitrile groups, isonitrile groups, cyanate groups, isocyanate groups, thiocyanate groups, isothiocyanate groups, azide groups, thio groups, thiolate groups, sulfide groups, sulfinate groups, sulfonate groups, phosphate groups, hydroxyl groups, alcoholate groups, phenolate groups, carbonyl groups and carboxylate groups. Groups that can be converted into an electron pair-donor group are, e.g., the carboxylic acid group or carboxylic acid anhydride group and the glycidyl group.

Bifunctional compounds (c) with several electron pair-donor groups contain e.g. an ethylene diamine group of correspondingly totally of partially alkylates groups, a glycol or glycolate group, a ketonic acid group or ketonic ester group, a β-dicarbonyl group (e.g. acetylactonate group), a β-keto ester group (e.g. acetoacetic acid ethyl-, -allyl- or -vinyl ester group) or a (meth)acrylic acid group.

In addition, the bifunctional compound (c) contains at least one group that can be converted through polycondensation into an inorganic network. These groups are derived from elements such as Si, Al, B, Sn, Ti, Zr, Ge, P, As or V, preferably Si, Al, Ti or Zr as the central atoms, to which are bonded the at least two hydrolyzable or polycondensible groups, e.g. hydrogen, hydroxy, halogen, alkoxy, alkoxyalkyl, acyl, acyloxy, alkoxycarbonyl or $NR_2$ (R=H and/or alkyl). Bifunctional compounds of this kind are cited, e.g. in the U.S. Pat. Ser. No. 5,030,608.

As an alternative the bifunctional compound (c) contains at least one group that can be converted through polymerization into an organic network. Examples of these groups are the epoxy group and groups having double or triple bonds such as vinyl, allyl, (meth)acryl and ethinyl.

The electron pair-donor group and the group of the bifunctional compound (c) that can be converted into an organic or inorganic network are bonded either directly together or preferably connected together by way of a bridge group (e.g. alkylene or arylene).

Specific examples of suitable bifunctional compounds (c) are:

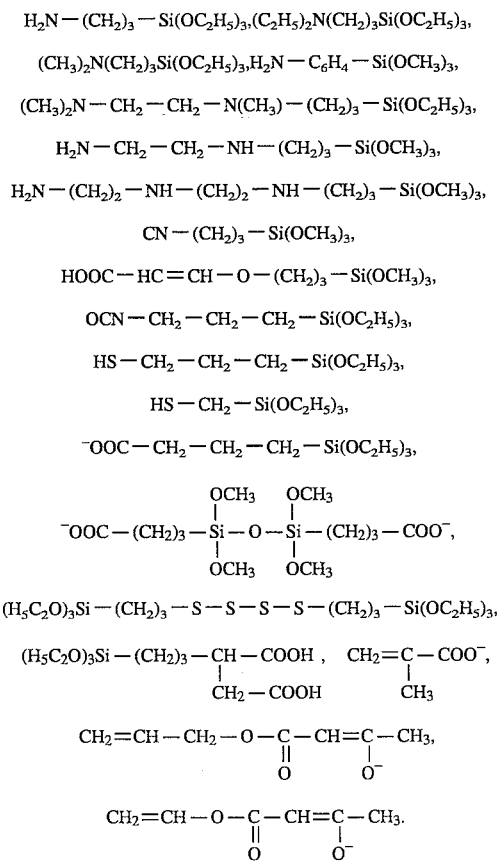

The reaction of the metal compound (a) with the precipitating reagent (b) in the presence of the bifunctional compound (c) can be conducted e.g. at temperatures ranging from 0° C. to the boiling point of the solvent that is used. Preferably one works at room temperature.

Even the reaction pressure is not critical. Usually the conversion takes place at atmospheric pressure; however, one can also work at raised or reduced pressure.

According to the invention, preferably alcohols, like methanol, ethanol, propanol and butanol; ethers, like diethyl ether, dibutyl ether and tetrahydrofuran; ether alcohols, like butoxyethanol; esters, like ethyl acetate; aliphatic and cycloaliphatic hydrocarbons, like pentane, hexane, and cyclohexane; and aromatic hydrocarbons, like toluene, are used as the organic solvents.

The reaction takes place within a few minutes up to some hours. Preferably one works under inert gas protection (e.g. nitrogen, argon, carbon dioxide).

The precipitating reagent (b) is applied in general usually in the stoichiometrically required amount, preferably in a small excess, based on the metal compound (a).

The molar ratio of the metal compound (a) to the bifunctional compound (c) is preferably 1:1 up to 1:50, in particular 1:5 to 1:20.

The sol of nanoscaled particles, which results from the reaction and is stabilized by means of the bifunctional compound (c), is mixed, optionally following partial removal of the solvent, with a compound, which can be cured or polymerized thermally or photochemically into a polymer, and a polymerization initiator (e).

Optionally a part of the compound (d) which can be polymerized or cured thermally or photochemically into a polymer can be replaced by a suitable, finished polymer (f), which is added additionally, e.g., as an organic solution.

Suitable polymers (f) are any known plastics, e.g. polyacrylic acid, polymethacrylic acid, polyacrylates, polymethacrylates, polyolefines, polystyrene, polyamides, polyimides, polyvinyl compounds, like polyvinyl chloride, polyvinyl alcohol, polyvinyl butyral, polyvinyl acetate and suitable copolymers, e.g. poly(ethylene-vinyl acetate), polyesters, e.g. polyethylene terephthalate or polydiallylphthalate, polyarylates, polycarbonates, polyethers, e.g. polyoxymethylene, polyethylene oxide or polyphenylene oxide, polyether ketones, polysulfones, polyepoxides, fluoropolymers, e.g. polytetrafluoroethylene, and organopolysiloxanes. Preferably transparent polymers (f) are used.

Compound (d) that can be cured or polymerized thermally or photochemically into a polymer is usually a polycondensible or polymerizable monomer, oligomer or prepolymer that exhibits unsaturated groups and that yields one of the aforementioned polymers during thermally or photchemically initiated polymerization or during (optionally acid- or base-catalyzed) polycondensation.

Specific examples of polymerizable monomers (d), which yield a purely organic polymer matrix, are (meth) acrylic acid, (meth)acrylic acid ester, (meth) acrylonitrile, styrene and styrene derivatives, alkenes (e.g. ethylene, propylene, butene, isobutene), halogenated alkenes (e.g. tetrafluoroethylene, chlorotrifluoroethylene, vinyl chloride, vinyl fluoride, vinylidene fluoride, vinylidene chloride), vinyl acetate, vinyl pyrrolidone, vinyl carbazole and mixtures of such monomers. Repeatedly unsaturated monomers (d) can also be used, e.g., butadiene and ethylene dimethacrylate.

Examples of monomers (d), which yield an organic/inorganic or purely inorganic polymer matrix, are hydrolyzable and condensible compounds of elements of the groups 3 to 6 and 13 to 15 of the periodic system or of the lanthanide elements. These hydrolyzable and condensible compounds are preferably those from Si, Al, B, Pb, Sn, Ti, Zr, V and Zn, in particular those from Si, Al, Ti and Zr or mixtures thereof. However, other hydrolyzable compounds can also be used, in particular those of the elements of the groups 1 and 2 of the periodic system (e.g. Na, K, Ca and Mg) or groups 7 to 10 of the periodic system (e.g. Mn, Fe, Co and Ni). Preferably the aforementioned compounds amount, however, to no more than 20 and in particular no more than 10 mole percent of the hydrolyzable monomeric compounds that were added in total.

Examples of hydrolyzable groups in these compounds are halogen (F, Cl, Br and I, in particular Cl and Br), alkoxy (in particular $C_{1-4}$ alkoxy, such as methoxy, ethoxy, n-propoxy, i-propoxy and butoxy), aryloxy (in particular $C_{6-10}$ aryloxy, e.g. phenoxy), acyloxy (in particular $C_{1-4}$ acyloxy, such as acetoxy and propionyloxy) and alkylcarbonyl (e.g. acetyl).

In addition to the aforementioned hydrolyzable groups, examples of other suitable groups are hydrogen and alkoxy groups having 5 to 20, especially 5 to 10 carbon atoms and halogen- and alkoxy-substituted alkoxy groups (such as β-methoxyethyoxy).

Since the hydrolyzable groups in the final product are virtually no longer present, but rather are lost through hydrolysis, whereby the hydrolysis product must also be removed sooner or later in some suitable manner, such hydrolyzable groups are especially preferred that carry no substituents and lead to hydrolysis products with low molecular weight, such as low alcohols, like methanol, ethanol, propanol, n-, i-, sec. and tert.-butanol. The latter groups are also preferred because they have virtually no effect on the pH value during hydrolysis, a feature that is advantageous, because the pH value of the starting mixture lies preferably in the range of 4 to 9, in particular 5 to 6.5; and hydrolysis products, which move the pH value noticeably out of this range, are neutralized through the addition of suitable substances (acids or bases).

The non-hydrolyzable groups of the added polycondensible monomers (d) are selected preferably from alkyl (in particular $C_{1-4}$ alkyl, such as methyl, ethyl, propyl and butyl), alkenyl (in particular $C_{2-4}$ alkenyl, such as vinyl, 1-propenyl, 2-propenyl and butenyl), alkinyl (in particular $C_{2-4}$ alkinyl, like acetylenyl and propargyl) and aryl (in particular $C_{6-10}$ aryl, such as phenyl and naphthyl), where the latter groups may or may not exhibit one or more substituents, such as halogen, hydroxy, alkoxy, epoxy, optionally substituted amino, etc. The above alkyl groups also include the corresponding cyclic and aryl-substitued groups, such as cyclohexyl and benzyl, whereas the alkenyl groups and alkinyl groups can also be cyclic and the aforementioned aryl groups are also supposed to include alkaryl groups (like tolyl and xylyl). Especially preferred non-hydrolyzable groups are those that have at their disposal a (repeatedly) unsaturated carbon-carbon bond. In this respect one must mentioned in particular groups that have at their disposal a (meth)acryloxy group, in particular a (meth)acryloxy-$C_{1-4}$ alky group, such as (meth)acryloxypropyl.

Specific examples of such monomers (d) are organosilanes (e.g. 3-glycidyloxypropyltrimethoxysilane, 3-methacryloxypropyl-trimethoxysilane or vinyl silanes). Suitable monomers (d) are, moreover, silicon-, aluminum-, titanium- and zirconium alkoxides, -acylates and -halogenides and other network formers, cited, e.g., in the U.S. Pat. Ser. No. 5,030,608.

The compound (d) and/or the polymer (f) can be added either as such or preferably as solution to an organic solvent. The solvent used is either identical to the solvent used in the preceding precipitation reaction or can be mixed with it.

The compound (d) and the polymer (f) that may or may not be added are generally used in such amounts that the resulting composite material contains 0.01 to 90 percent by weight of nanoscaled particles and 10 to 99.99 percent by weight of the polymer matrix. If the polymer (f) is used, this proportion of the total amount of polymer (f) and compound (d) is at least 1 percent by weight and at most 95 percent by weight, preferably a maximum of 50 percent by weight.

Suitable polymerization initiators (e), which can induce thermally and/or photochemically the polymerization and cross-linking of the existing unsaturated compounds, are, e.g., the commercially available photo initiators. Examples are Irgacure® 184 (1-hydroxycyclohexylphenylketone), Irgacure® 500 (1-hydroxycyclohexylphenylketone, benzophenone) and other photo initiators of the Irgacure® type that are available from the Ciba-Geigy Company; Darocur® 1173, 1116, 1398, 1174 and 1020 (available from the Merck Company), benzophenone, 2-chlorothioxanthone, 2-methylthioxanthone, 2-isopropylthioxanthone, benzoin, 4,4'-dimethoxybenzoin, benzoin ethyl ether, benzoin isopropyl ether, benzyl dimethyl ketal, 1,1,1-trichloroacetophenone, diethoxyacetophenone and dibenzosuberone.

Suitable thermal initiators are, e.g., organic peroxides in the form of diacylperoxides, peroxydicarbonates, alkyl peresters, dialkyl peroxides, perketals, ketone peroxides and alkyl hydroperoxides. Concrete examples of such thermal initiators are dibenzoyl peroxide, tert. butyl perbenzoate and azobisisobutyronitrile.

The polymerization catalysts (e) that induce the polycondensation are, e.g. Brönsted acids and bases, like mineral acids or tertiary amines, for the anionic polycondensation and Lewis acids, like metal alcoholates (e.g. aluminum alcoholates in the case of epoxysilanes) for cationic polycondensation.

The polymerization initiator (e) is usually applied in an amount ranging from 0.1 to 5, preferably 0.5 to 3% by weight, based on the mixture.

If the reaction components that are used contain groups that can be converted into an inorganic network, hydrolysis and polycondensation of these groups can be conducted through the addition of water. The molar ratio of the total amount of water added to the hydrolyzable groups in all of the added starting compounds ranges preferably from 1:1 to 0.3:1, in particular 0.7:1 to 0.5:1. The polycondensation can be conducted, e.g., in air at temperatures ranging from 0° C. to the boiling point of the solvent that is used, usually at room temperature. The end of the reaction can be determined, e.g., through Karl-Fischer titration.

The reaction mixture can be further processed either as such or following partial or total removal of the organic solvent that was added or the solvent that formed during the reaction (e.g. the alcohols produced due to the hydrolysis of the alkoxides).

If coatings are produced, the reaction mixture is applied on the substrate either immediately or following partial removal of the solvent or following addition of more solvent as a function of its viscosity and then dried.

If mouldings are produced, the reaction mixture can be poured into suitable moulds and then the solvent can be totally removed, so that a gel remains.

Finally, the material is cured thermally and/or through irradiation with actinic radiation (e.g. ultraviolet light or laser beams) as a function of the kind of polymer matrix and the polymerization initiator (e) that is used. The curing conditions (temperature, ultraviolet wavelength, etc.) depend in the case of polymerization of unsaturated groups on the decay conditions of the polymerization initiator. Thermal curing takes place usually at temperatures below 150° C.

The composite materials according to the invention contain nanoscaled particles (clusters) having an average particle size ranging from about 0.5 to 20 nm, distributed in the polymer matrix. By selecting the suitable reaction components and the reaction conditions, the size and distribution of the cluster can be controlled.

If transparent polymer components are used, the composite materials according to the invention have outstanding properties for optical applications. Both optically transparent mouldings and coatings can be produced, which can be structured, e.g., through laser writing, embossing or photo mask technology.

Specific fields of application are:
tunable, structured, linear optical elements for passive applications, like filters or wave guides;
tunable, structured, non-linear optical elements for active applications, like signal processing, computation, frequency doubling or tripling, light amplification for optical data transmission, lasing, laser-self-focussing, wave mixing, phase conjugation or holography, e.g. optical switches, decoloring absorbers and holographic elements;

photovoltaic solid cells, photoelectrochemical solar cells and quantum point-semiconductors.

The following examples explain the invention.

EXAMPLE 1

$2 \cdot 10^{-3}$ mole of cadmium acetate are dissolved in 200 ml of ethanol at room temperature; and then $2 \cdot 10^{-3}$ mole of 3-aminopropyltriethoxysilane are added. The mixture is degasses under a $N_2$ atmosphere. $5 \cdot 10^{-3}$ mole of $H_2S$ are added to the mixture and stirred at room temperature for 10 minutes. Finally 150 ml of the solvent are removed through distillation in a vacuum.

First, $2 \cdot 10^{-1}$ mole of 3-glycidyloxypropyltrimethoxysilane are added to the resulting solution; and then after stirring for 15 minutes $2 \cdot 10^{-2}$ mole of aluminum tributoxyethanolate are added. After stirring for 30 minutes at room temperature, $3.6 \cdot 10^{-1}$ mole of water were added to the mixture. Then the mixture was stirred for 3 hours.

The resulting coating solution is applied on a glass substrate by means of immersion and cured at 60° C. for 60 minutes. To produce mouldings, the residual solvent is removed through distillation in a vacuum and the resulting viscous solution is poured into a mould and cured for one hour at 60° C.

EXAMPLE 2

The procedure is analogous to that in example 1, but, instead of 3-aminopropyltriethoxysilane, N-[2-aminoethyl]-3-aminopropyl-trimethoxysilane is used.

EXAMPLE 3

The procedure is analogous to that in example 1, but, instead of 3-aminopropyltriethoxysilane, triamino-modified propyltrimethoxysilane [$H_2N$-$(CH_2)_2NH(CH_2)_2NH(CH_2)_3Si(OCH_3)_3$] is used.

EXAMPLE 4

The procedure is analogous to that in example 1, but, instead of 3-aminopropyltriethoxysilane, 3-mercaptopropyltrimethoxysilane is used.

EXAMPLE 5

$2 \cdot 10^{-3}$ mole of cadmium acetate are dissolved in 200 ml of ethanol at room temperature; and $2 \cdot 10^{-3}$ mole of bis[3-triethoxysilylpropyl]-tetrasulfide are added. The mixture is degassed under a $N_2$ atmosphere. Then $2 \cdot 10^{-2}$ mole of sodium tetrahydridoborate in 10 ml ethanol are added to the mixture and stirred at room temperature for 30 minutes. Finally 150 ml of the solvent are removed through distillation in a vacuum.

First, $2 \cdot 10^{-1}$ mole of 3-glycidyloxypropyltrimethoxysilane are added to the resulting solution; and then after stirring for 15 minutes $2 \cdot 10^{-2}$ mole of aluminum tributoxyethanolate are added. After stirring for 30 minutes at room temperature, $3.6 \cdot 10^{-1}$ mole of water were added to the mixture for the purpose of hydrolysis. Then the mixture was stirred for 3 hours.

The resulting coating solution is applied on a glass substrate by means of immersion and cured at 60° C. for 60 minutes. To produce mouldings, the residual solvent is removed through distillation in a vacuum, and the resulting viscous solution is poured into a mould and cured for one hour at 60° C.

EXAMPLE 6

The procedure is analogous to that in example 1, but, instead of 3-aminopropyltriethoxysilane, (3-triethoxysilylpropyl)-succinic acid, just prepared from $2 \cdot 10^{-2}$ (3-triethoxysilylpropyl)-succinic acid anhydride and $2 \cdot 10^{-2}$ mole of water, is used.

EXAMPLE 7

$2 \cdot 10^{-3}$ mole of cadmium acetate are dissolved in 200 ml of ethanol at room temperature; and $2 \cdot 10^{-2}$ mole of 3-aminopropyltriethoxy-silane are added. The mixture is degassed under a $N_2$ atmosphere. Then $2 \cdot 10^{-2}$ mole of $H_2S$ are added to the mixture and stirred at room temperature for 10 minutes. Finally 150 ml of the solvent are removed through distillation.

Then $2 \cdot 10^{-1}$ mole of 3-methacryloxypropyltrimethoxysilane are added to the resulting solution and stirred at room temperature for 15 minutes. For the purpose of hydrolysis, $3.3 \cdot 10^{-1}$ mole of $H_2O$ are added to the mixture and then stirred at room temperature for 3 hours. To coat substrates and to produce mouldings, 1% by wt. of tert.-butyl perbenzoate is added to the resulting viscous solution. The rest of the process is analogous to that in example 1.

EXAMPLE 8

The procedure is analogous to that in example 7, but, instead of 3-aminopropyltriethoxysilane, N-[2-aminoethyl]-3-amino-propyltrimethoxysilane is used.

EXAMPLE 9

The procedure is analogous to that in example 7, but, instead of 3-aminopropyltriethoxysilane, triamino-modified propyltrimethoxysilane [$H_2N$-$(CH_2)_2NH(CH_2)_2NH(CH_2)_3Si(OCH_3)_3$] is used.

EXAMPLE 10

The procedure is analogous to that in example 7, but, instead of 3-aminopropyltriethoxysilane, 3-mercaptopropyltrimethoxysilane is used.

EXAMPLE 11

$2 \cdot 10^{-3}$ mole of cadmium acetate are dissolved in 200 ml of ethanol at room temperature; and $2 \cdot 10^{-2}$ mole of bis[3-triethoxysilyl-propyl]-tetrasulfide are added. The mixture is degassed under a $N_2$ atmosphere. Then $2 \cdot 10^{-2}$ mole of sodium tetrahydridoborate in 10 ml ethanol are added to the mixture and stirred at room temperature for 30 minutes. After 150 ml of the solvent are removed through distillation, the mixture is further processed as in example 7.

EXAMPLE 12

The procedure is analogous to that in example 7, but, instead of 3-aminopropyltriethoxysilane, 3-triethoxysilylpropyl)-succinic acid, just prepared from $2 \cdot 10^{-2}$ (3-triethoxysilylpropyl) succinic acid anhydride and $2 \cdot 10^{-2}$ mole of water, is used.

EXAMPLE 13

The procedure is analogous to that in example 1, but, instead of cadmium acetate, silver nitrate is used.

EXAMPLE 14

The procedure is analogous to that in example 2, but, instead of cadmium acetate, silver nitrate is used.

EXAMPLE 15

The procedure is analogous to that in example 3, but, instead of cadmium acetate, silver nitrate is used.

EXAMPLE 16

The procedure is analogous to that in example 4, but, instead of cadmium acetate, silver nitrate is used.

EXAMPLE 17

The procedure is analogous to that in example 5, but, instead of cadmium acetate, silver nitrate is used.

EXAMPLE 18

The procedure is analogous to that in example 6, but, instead of cadmium acetate, silver nitrate is used.

EXAMPLE 19

The procedure is analogous to that in example 7, but, instead of cadmium acetate, silver nitrate is used.

EXAMPLE 20

The procedure is analogous to that in example 8, but, instead of cadmium acetate, silver nitrate is used.

EXAMPLE 21

The procedure is analogous to that in example 9, but, instead of cadmium acetate, silver nitrate is used.

EXAMPLE 22

The procedure is analogous to that in example 10, but, instead of cadmium acetate, silver nitrate is used.

EXAMPLE 23

The procedure is analogous to that in example 11, but, instead of cadmium acetate, silver nitrate is used.

EXAMPLE 24

The procedure is analogous to that in example 12, but, instead of cadmium acetate, silver nitrate is used.

EXAMPLE 25

The procedure is analogous to that in example 7, but, instead of 3-aminopropyltriethoxysilane, methacrylic acid is used.

EXAMPLE 26

The procedure is analogous to that in example 25, but, instead of cadmium acetate, silver nitrate is used.

EXAMPLE 27

The procedure is analogous to that in example 25, but, instead of 3-metharyloxypropyltrimethoxysilane, triethylene glycol dimethacrylate is used.

EXAMPLE 28

The procedure is analogous to that in example 27, but, instead of cadmium acetate, silver nitrate is used.

EXAMPLE 29

0.1 mole of cadmium acetate are dissolved in 250 ml of ethanol at room temperature; and 2 mole of 3-aminopropyltriethoxysilane are added. The mixture is degassed under $N_2$ atmosphere. 0.1 mole of $(CH_3)_3$-Si-S-Si$(CH_3)_3$ (diluted with tetrahydrofuran 1:1) is added drop-by-drop to the mixture. Finally 200 ml of the solvent are removed by means of distillation in a vacuum.

The mixture is further processed as in example 1. At variance with this process, the conditions of examples 2 to 4 and 13 are applied.

EXAMPLE 30

0.1 mole of zinc acetate ($Zn(Ac)_2 \cdot 2H_2O$) are dissolved in 260 ml of ethanol at 80° C. (3 hours); the solution is cooled to room temperature; and 2 mole of 3-aminopropyltriethoxysilane are added. The mixture is degassed with $N_2$.

The mixture is further processed as in example 29.

EXAMPLE 31

The procedure is analogous to that in example 30, but, instead of zinc acetate, lead ethoxyethanolate is used.

EXAMPLE 23

0.01 mole of $HAuCl_4$ are dissolved in 50 ml of ethanol and treated with triamino-functionalized silane (the molar ratio Au/Si ranges from 1/5 to 1:100). Spontaneous metal clusters are formed and a sol that is stable for a long time is produced. The mixture is further processed as in example 7; that is, 0.2 mole of 3-methacryloxypropyltrimethoxysilane (MEMO) is added to the solution.

EXAMPLE 33

The procedure is analogous to that in example 32, but, instead of $HAuCl_4$, silver acetate or silver nitrate is used.

EXAMPLE 34

The procedure is analogous to that in example 32, but, instead of $HAuCl_4$, $H_2PtCl_6$ is used.

EXAMPLE 35

0.01 mole of $HAuCl_4$ are dissolved in 50 ml of ethanol and treated with N-aminoethyl-3-aminopropyltrimethoxysilane (DIAMO). Then 0.1 mole of MEMO-pre-hydrolysate are added. 0.1% by wt. of azoisobutyronitrile starter is added to the resulting coating solution and further used for coating glass substrates. Wet films are treated photothermally (1 minute, ultraviolet, 120° C.). The result is a simultaneous formation of Au particles and curing of the matrix.

EXAMPLE 36

The procedure is analogous to that in example 35, but, instead of HAuCl$_4$, silver acetate or silver nitrate is used.

EXAMPLE 37

The procedure is analogous to that in example 35, but, instead of HAuCl$_4$, H$_2$PtCl$_6$ is used.

EXAMPLE 38

DIAMO is added to nanocrystalline ZnO in ethanol (molar ratio ZnO/DIAMO=1:20) and stirred into MEMO-prehydrolysate at room temperature. The ZnO/MEMO molar ratio varies between ⅓ and 1:100. The solvent is removed and the produce is used for producing mouldings.

EXAMPLE 39

The procedure is analogous to that in example 38, but, instead of ZnO, TiO$_2$ is used.

We claim:

1. A process for producing a composite material, comprising nanoscaled particles having an average particle size of from about 0.5 to 20 nm distributed throughout, which process comprises:
   a) reacting a compound a), which contains a metal selected from the group consisting of groups VIa, VIIa, VIIIa, Ib, IIb, IIIb, IVb, Vb, and lanthanides, in a solvent, and soluble therein, with a precipitating reagent b), thereby precipitating antimonides, arsenides, chalcogenides, halogenides or phosphides of said metal of said compound in the presence of a bifunctional compound c), which contains at least one electron pair-donor group and at least one group, which is convertible through polymerization of polycondensation into an organic or inorganic network, to form a stabilized sol of said nanoscaled particles; and
   b) mixing said stabilized sol of said nanoscaled particles with a compound d), which is polymerizable or thermally or photochemically curable into a polymer, and a polymerization initiator; and hydrolyzing and polycondensing said mixture, and curing the same to form said composite material.

2. The process as claimed in claim 1, wherein a solution of the compound (d), which can be cured or polymerized thermally or photochemically into a polymer, is used in an organic solvent.

3. The process as claimed in claim 1, wherein the stabilized sol of said nanoscaled particles is mixed additionally with a polymer (f) that is soluble in organic solvent.

4. The process as claimed in claim 1, wherein alcohols, ethers, esters, aliphatic or aromatic hydrocarbons are used as the organic solvents.

5. The process as claimed in claim 1, wherein salts of the corresponding anions, the corresponding hydrogen compounds or compounds from which the actual precipitating agent is released in situ, are used as the precipitating reagents (b).

6. The process as claimed in claim 1, wherein the precipitating reagent (b) is added in small stoichiometric excess, based on a metal compound (a).

7. The process as claimed in claim 1, wherein the molar ratio of the metal compound (a) to the bifunctional compound (c) is about 1:1 to 1:50.

8. The process as claimed in claim 1, wherein the compound (d), which is polymerizable or thermally or photochemically curable into a polymer, is added in an amount such that the resulting composite material contains 0.01 to 90% by weight of said nanoscaled particles and 10 to 99.99% by weight of the polymer matrix.

9. The process as claimed in claim 3, wherein said polymer (f) is added in an amount such that the resulting composite material contains 0.01 to 90% by weight of said nanoscaled particles 10 to 99.99% by weight of the polymer matrix.

10. The process as claimed in claim 1, wherein said precipitating reagent (b) is an alkali- or alkaline earth metal salt of a corresponding anion selected from the group consisting of antimonides, hydroxides, sulfides, selenides, tellurides, fluorides, chlorides, bromides, iodides and phosphides.

11. The process as claimed in claim 1, wherein said precipitating reagent (b) is an alkali- or alkaline earth metal salt of a corresponding hydrogen compound selected from the group consisting of SbH$_3$, AsH$_3$, H$_2$S, H$_2$Se, H$_2$Te, HCl, HBr, HI and PH$_3$.

12. The process as claimed in claim 1, wherein said nanoscaled particles are selected from the group consisting of ZnO, CdO, SiO$_2$, TiO$_2$, ZrO$_2$, CeO$_2$, SnO$_2$, Al$_2$O$_3$, In$_2$O$_3$, La$_2$O$_3$, Fe$_2$O$_3$, Cu$_2$O, MoO$_3$, WO$_3$, CdS, ZnS, PbS, Ag$_2$S, GaSe, CdSe, ZnSe, ZnTe, CdTe, AgCl, AgBr, AgI, CuCl, CdI$_2$, PbI$_2$, AlAs, GaAs, GeAs, InSb, GaP, InP, Zn$_3$P$_2$ and Cd$_3$P$_2$.

13. The process as claimed in claim 1, wherein said bifunctional compound c) is selected from the group consisting of:

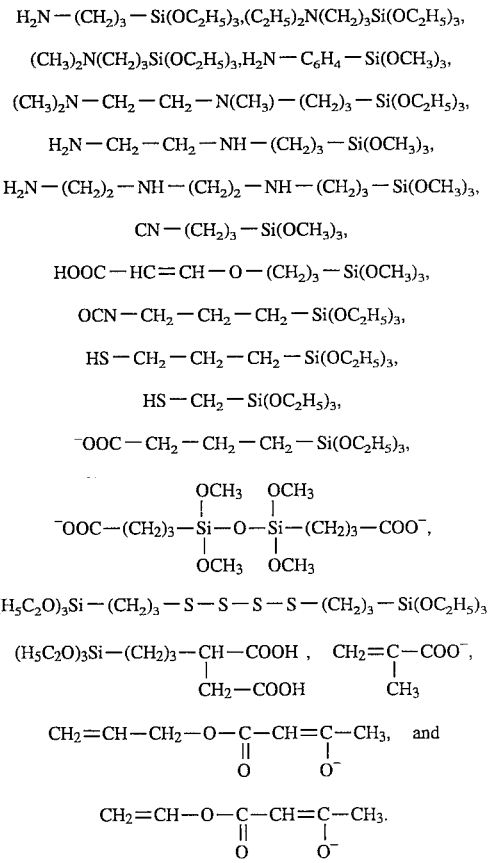

14. A composite material, which comprises nanoscaled particles having an average particle size of from about 0.5 to 20 nm distributed throughout, which particles are made by a process which comprises:

a) reacting a compound, which contains a metal selected from the group consisting of groups VIa, VIIa, VIIIa, Ib, IIb, IIIb, IVb, Vb, and lanthanides, in a solvent, and soluble therein, with the precipitating reagent, thereby precipitating antimonides, arsenides, chalcogenides, halogenides or phosphides of said metal of said compound in the presence of a bifunctional compound, which contains at least one electron pair-donor group and at least one group, which is convertible through polymerization or polycondensation into an organic or inorganic network, to form a stabilized sol of said nanoscaled particle; and b) mixing the stabilized sol of said nanoscale particles for the compound d), which is polymerizable or thermally curable of photochemically curable into a polymer, and a polymerization initiator; and hydrolyzing and polycondensing the mixture, and curing the same to form the composite material.

15. The composite material according to claim 14, wherein said nanoscaled particles are selected from the group consisting of $ZnO$, $CdO$, $SiO_2$, $TiO_2$, $ZrO_2$, $CeO_2$, $SnO_2$, $Al_2O_3$, $In_2O_3$, $La_2O_3$, $Fe_2O_3$, $Cu_2O$, $MoO_3$, $WO_3$, $CdS$, $ZnS$, $PbS$, $Ag_2S$, $GaSe$, $CdSe$, $ZnSe$, $ZnTe$, $CdTe$, $AgCl$, $AgBr$, $AgI$, $CuCl$, $CdIz$, $PbI_2$, $AlAs$, $GaAs$, $GeAs$, $InSb$, $GaP$, $InP$, $Zn_3P_2$ and $Cd_3P_2$.

16. The composite material according to claim 14, wherein said polymer is used in such an amount that the composite material contains 0.01 to 90% by weight of said nanoscaled particles and 10 to 99.99% by weight of the polymer matrix.

17. The composite material according to claim 14, wherein said polymer is transparent.

18. The composite material according to claim 14, wherein said compound d) is selected from the group consisting of (meth) acrylic acid, (meth) acrylic acid esters, (meth) acrylonitrile, styrene, ethylene, propylene, butene, isobutene, tetrafluorethylene, chlorotrifluorethylene, vinyl chloride, vinyl fluoride, vinylidene fluoride, vinylidene chloride, vinyl acetate, vinyl pyrrolidene, vinyl carbazole, butadiene, ethylene dimethacrylate and mixtures thereof.

* * * * *

UNITED STATES PATENT AND TRADEMARK OFFICE
CERTIFICATE OF CORRECTION

PATENT NO. : 5,470,910
DATED : November 28, 1995
INVENTOR(S) : Lubomir SPANHEL ET AL.

It is certified that error appears in the above-indentified patent and that said Letters Patent is hereby corrected as shown below:

On the title page, Item [75], the third inventor's name, should read:

--Rüdiger Nab--

Signed and Sealed this

Fourteenth Day of May, 1996

Attest:

BRUCE LEHMAN

*Attesting Officer*    *Commissioner of Patents and Trademarks*